United States Patent
Walden et al.

(10) Patent No.: US 8,939,484 B2
(45) Date of Patent: *Jan. 27, 2015

(54) ERGONOMICALLY DESIGNED MULTI-HANDLED TOOL

(71) Applicant: Bosse Tools, LLC, Phoenix, AZ (US)

(72) Inventors: Stephen Walden, Phoenix, AZ (US); Ronald Johnson, Los Gatos, CA (US); Steven Escobar, Los Gatos, CA (US)

(73) Assignee: Bosse Tools LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,625

(22) Filed: Apr. 22, 2014

(65) Prior Publication Data

US 2014/0217760 A1 Aug. 7, 2014

Related U.S. Application Data

(63) Continuation of application No. 13/754,016, filed on Jan. 30, 2013, now Pat. No. 8,740,272.

(60) Provisional application No. 61/632,761, filed on Jan. 30, 2012, provisional application No. 61/687,214, filed on Apr. 19, 2012.

(51) Int. Cl.
*A01B 1/22* (2006.01)
*B25G 3/38* (2006.01)
*B25G 1/00* (2006.01)
*A01B 1/02* (2006.01)

(52) U.S. Cl.
CPC ... *B25G 1/00* (2013.01); *A01B 1/02* (2013.01); *A01B 1/024* (2013.01); *A01B 1/026* (2013.01)
USPC .............................. 294/58; 294/60

(58) Field of Classification Search
CPC .......... A01B 1/024; A01B 1/026; B25G 1/06; B25G 1/102; B25G 3/38
USPC ................. 294/58, 178, 60; 16/430; 15/144.1
See application file for complete search history.

(56) References Cited

U.S. PATENT DOCUMENTS

| | | | | | |
|---|---|---|---|---|---|
| 212,953 | A | * | 3/1879 | Kreider | 294/49 |
| 821,847 | A | * | 5/1906 | Arnavat | 294/57 |
| 842,912 | A | * | 2/1907 | Rundell | 294/58 |
| 2,772,910 | A | * | 12/1956 | Doyle | 294/58 |
| 3,014,750 | A | * | 12/1961 | Briggs | 294/58 |
| 3,136,574 | A | * | 6/1964 | Pasquale | 294/54.5 |
| D198,979 | S | * | 8/1964 | Petoe | D8/10 |

(Continued)

FOREIGN PATENT DOCUMENTS

| GB | 584189 | * | 1/1947 |
| WO | WO 0122793 | * | 5/2001 |

*Primary Examiner* — Dean Kramer
(74) *Attorney, Agent, or Firm* — Schmeiser, Olsen & Watts LLP

(57) ABSTRACT

Described is a multi-handled tool that is ergonomically designed to maximize the efficiency of the tool by the use of a handle, optionally rotating, affixed to the shaft of the tool. The rotating handle may be rotated and locked into any desired position so the user can adjust the tool to create maximum efficiency. In addition, a footstep is optionally provided above the tool that allows for a greater digging force. A combination of the first, top handle with the ergonomically spaced handle placement that is completely adjustable combined with the footstep above the head of the tool provides for a tool that is much more efficient than the standard tools used today.

30 Claims, 7 Drawing Sheets

(56) References Cited

U.S. PATENT DOCUMENTS

| | | | | |
|---|---|---|---|---|
| 3,981,043 A * | 9/1976 | Curry | | 16/430 |
| 4,050,728 A * | 9/1977 | Davidson | | 294/58 |
| 4,103,954 A * | 8/1978 | Vaslas | | 294/58 |
| 4,264,096 A * | 4/1981 | Barnett | | 294/58 |
| 4,615,553 A * | 10/1986 | Hultine | | 294/58 |
| D296,410 S * | 6/1988 | Abbott | | D8/10 |
| 4,787,661 A * | 11/1988 | Rutledge | | 294/58 |
| 4,930,181 A * | 6/1990 | Johnson | | 16/426 |
| 4,944,541 A * | 7/1990 | Waldschmidt | | 294/58 |
| 5,054,830 A * | 10/1991 | Nisenbaum | | 294/58 |
| 5,133,582 A * | 7/1992 | Rocha | | 294/58 |
| 5,400,471 A * | 3/1995 | Lichfield et al. | | 16/426 |
| 5,431,468 A * | 7/1995 | Rosenshine | | 294/58 |
| 5,447,349 A * | 9/1995 | Coble | | 294/58 |
| 5,472,252 A * | 12/1995 | Barone | | 294/58 |
| 5,487,577 A * | 1/1996 | Ball | | 294/58 |
| 5,496,085 A * | 3/1996 | Middleton | | 294/58 |
| 5,499,852 A * | 3/1996 | Seigendall | | 294/58 |
| 5,581,839 A * | 12/1996 | Ferrell, Jr. | | 15/143.1 |
| D377,300 S * | 1/1997 | Fredrick von Essen | | D8/10 |
| 5,645,305 A * | 7/1997 | Lispi | | 294/58 |
| 5,704,672 A * | 1/1998 | Sims | | 294/58 |
| 5,771,535 A * | 6/1998 | Blessing | | 16/430 |
| 5,799,996 A * | 9/1998 | Fredrickson | | 294/51 |
| 5,921,600 A * | 7/1999 | Lucas | | 294/58 |
| 5,927,058 A * | 7/1999 | Hsu | | 56/400.16 |
| D417,382 S * | 12/1999 | Saladino, Jr. | | D8/107 |
| 6,062,619 A * | 5/2000 | Clark, Jr. | | 294/58 |
| 6,343,822 B1 * | 2/2002 | Badura | | 294/58 |
| 6,592,160 B1 * | 7/2003 | Nicolay et al. | | 294/57 |
| 6,601,887 B2 * | 8/2003 | Graves | | 294/58 |
| 6,830,271 B2 * | 12/2004 | Piscopo et al. | | 294/58 |
| 6,955,228 B2 * | 10/2005 | Hixon | | 172/378 |
| 7,124,474 B2 * | 10/2006 | Nicolay et al. | | 16/436 |
| 7,300,081 B1 * | 11/2007 | Murray et al. | | 294/58 |
| D558,004 S * | 12/2007 | Kelly, Jr. et al. | | D8/10 |
| 7,657,972 B2 * | 2/2010 | Jenkins | | 16/426 |
| 8,740,272 B2 * | 6/2014 | Walden et al. | | 294/58 |
| 2003/0057721 A1 * | 3/2003 | Ducklow | | 294/58 |
| 2005/0099029 A1 * | 5/2005 | Lerman | | 294/58 |
| 2005/0206178 A1 * | 9/2005 | Hoeft | | 294/58 |
| 2008/0196205 A1 * | 8/2008 | Hixon | | 16/426 |
| 2011/0099765 A1 * | 5/2011 | Youssefieh | | 16/430 |

* cited by examiner

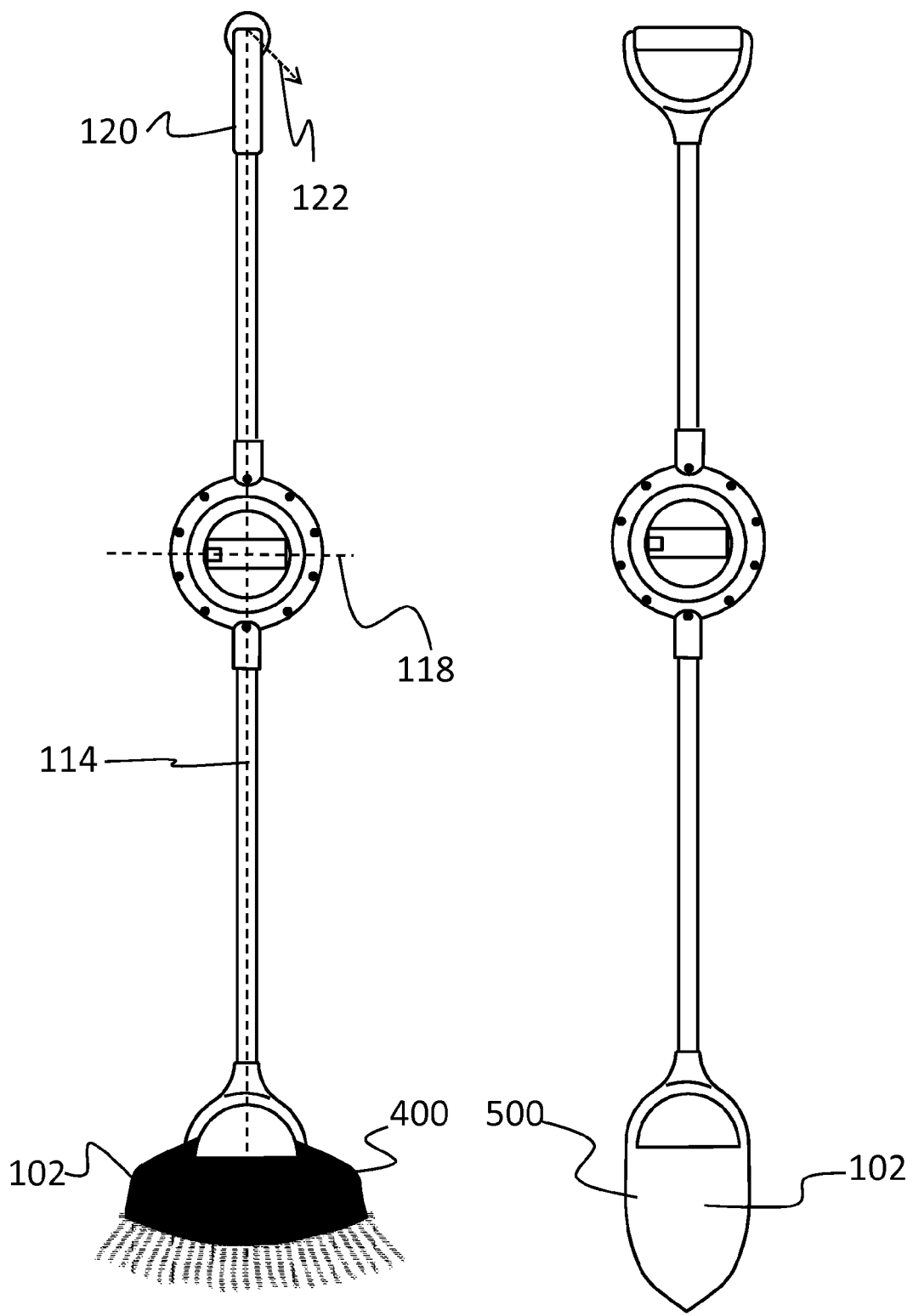

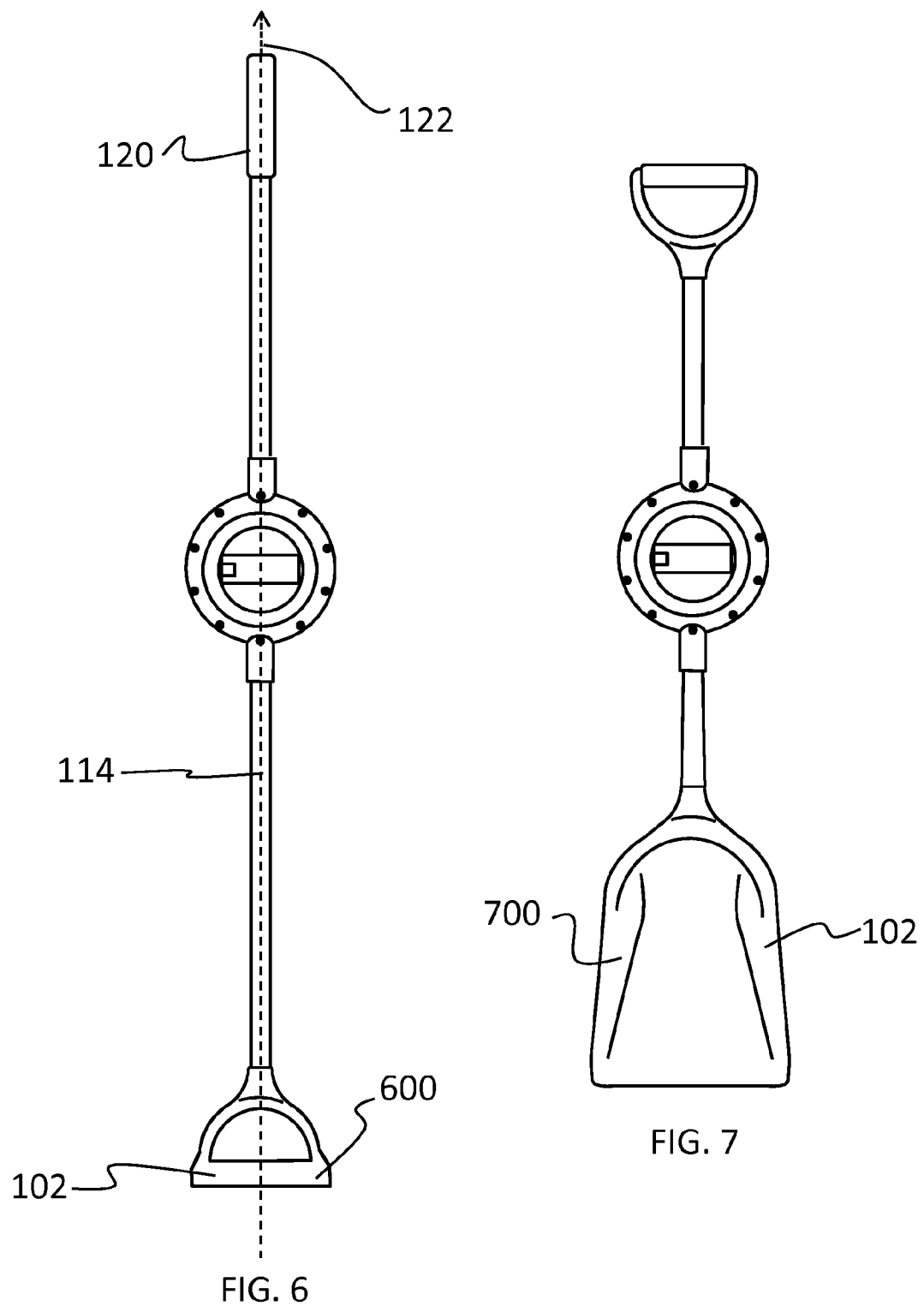

ERGONOMICALLY DESIGNED MULTI-HANDLED TOOL

CROSS REFERENCE TO RELATED APPLICATION

This application is a continuation of U.S. Nonprovisional patent application Ser. No. 13/754,016, filed on Jan. 30, 2013 and entitled "ERGONOMICALLY DESIGNED MULTI-HANDLED TOOL", which claims priority to U.S. Provisional Patent Application No. 61/632,761, filed on Jan. 30, 2012 and entitled, "HANDLE-IT. THE TWO HANDLED SHOVEL.", and U.S. Provisional Patent Application No. 61/687,214, filed on Apr. 19, 2012 and entitled, "HANDLE-IT. THE ERGONOMICALLY DESIGNED DOUBLE-HANDLED TOOL", the disclosures of which are hereby incorporated entirely herein by reference.

BACKGROUND

1. Technical Field

The present invention relates to a multi-handled tool for use with an implement attached on one end thereof and, more particularly, to a tool, such as a shovel, with a mid-positioned handle with the optional inclusion of a foot step above the tool end.

2. State of the Art

The home, garden, and construction markets need ergonomically designed tools that maximize the strength of the user. Current tools do not have a handle on the shaft that allows maximization of the strength of the user. In addition, any prior attempts to make two-handled tools have not successfully created an efficient design.

A traditional tool, such as but not limited to a shovel, uses a straight shaft with one handle at the end. The user is forced to use the shaft as a second handle, which results in loss of leverage. This is especially true when the user is digging a hole or moving a material to one side. Since the shaft is straight, there is a loss of leverage when moving the material to one side or the other.

Moreover, current tools, not limited to shovels, have a footstep that is used to exert greater digging force. However, the footstep is located off-center and the users lose force by having to place their foot on the side of the shovelhead while digging. As such, not only can this result in an undesirably shaped hole but there is also potentially wasted energy.

Thus, a continuing need exists for an improved design for home, garden, and construction tools with a shaft handle to maximize leverage and strength application of the user while using the shovel.

SUMMARY

The present invention relates to a multi-handled tool that is made up of an elongated shaft with a user end and a tool end. A tool implement is attached with the tool end. A first handle is attached with the user end. Further, a second handle is attached with the elongated shaft between the user end and the tool end.

In another aspect, the elongated shaft has a long axis and the first handle is attached with the elongated shaft such that it intersects the long axis of the elongated shaft.

In yet another aspect, a footstep is positioned between the tool implement and the tool end of the elongated shaft, the footstep intersecting the long axis of the elongated shaft.

In another aspect, the elongated shaft has a long axis and the second handle is attached to the elongated shaft in a stationary position between the user end and the tool end.

In another aspect, the elongated shaft and the first and second handles are formed of one piece of material.

In yet another aspect, the elongated shaft and first and second handles are separate and distinct components that are attached with one another.

In yet another aspect, a rotating mechanism is included. In this aspect, the second handle is affixed with the rotating mechanism such that the rotating mechanism is adapted to allow for rotation of the second handle.

The rotating mechanism includes a circular frame with the second handle attached thereto; a first member; and a second member. The circular frame is positioned between the first and second members to allow for rotation of the circular frame with respect to each of the first and second members. The circular frame includes sliding portions and each of the first and second members include a recess that is formed to accommodate the sliding portions, thereby allowing the circular frame to rotate within the first and second members.

In another aspect, a locking lever is attached with the circular frame. The locking lever is adapted to engage with at least one of the first and second members to lock the circular frame with respect to the first and second members.

Finally, the present invention also comprises a method for making and using the tool described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is an illustration of a multi-handled tool according to the principles of the present invention, depicting alternative aspects of a tool implement, in which the tool implement is a rake;

FIG. 5 is an illustration of a multi-handled tool according to the principles of the present invention, depicting alternative aspects of a tool implement, in which the tool implement is a pointed spade shovel;

FIG. 6 is an illustration of a multi-handled tool according to the principles of the present invention, depicting alternative aspects of a tool implement, in which the tool implement is a blade;

FIG. 7 is an illustration of a multi-handled tool according to the principles of the present invention, depicting alternative aspects of a tool implement, in which the tool implement is a snow shovel.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Specific Details

Figure 1A:
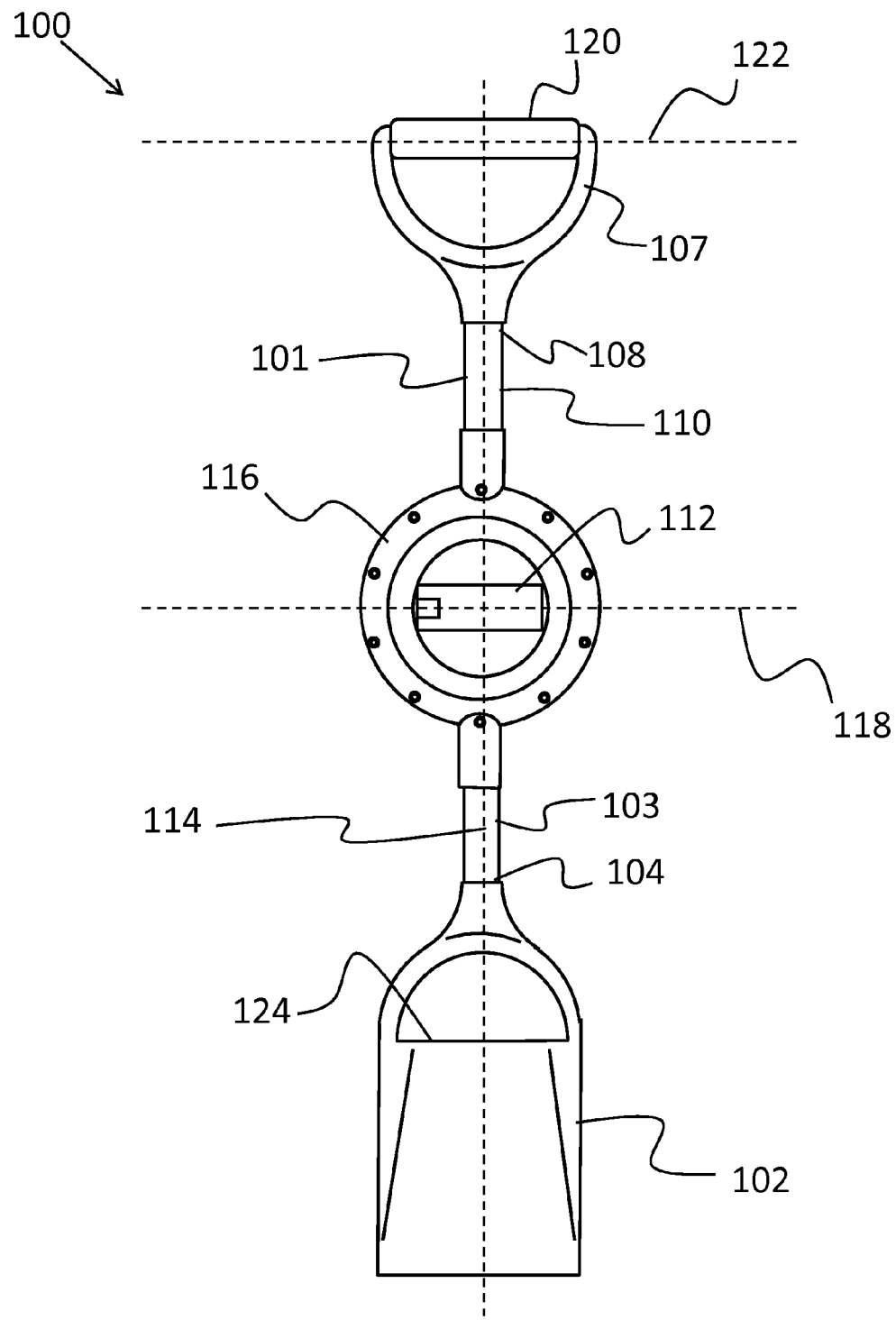
FIG. 1A is an illustration of a multi-handled tool according to the principles of the present invention, depicting the tool as having both an end first handle and a mid-positioned, second handle.

As shown in FIG. 1A, the present invention relates to a multi-handled tool 100 for use with a tool implement 102. The tool 100 includes a first handle 107 at a handle end 108, with the tool implement 102 attached at a tool end 104. Connecting the first handle 107 with the tool implement 102 is a post or elongated shaft 110 (or any other suitable connecting mechanism, such as adjacent shafts, etc.). Importantly, positioned within (or otherwise attached with) the shaft 110 between the tool implement 102 and the first handle 107 is a second handle 112. The elongated shaft 110 is formed of any suitably rigid material, non-limiting examples of which include metal, steel, fiberglass, plastic, or wood, or any combination thereof.

The second handle 112 is a mid-positioned handle that is formed or attached at any desirable location along the shaft 110. Although the term "mid" is used, the second handle 112 is not necessarily at a middle point in the shaft 110 and, instead, can be formed or attached at any desirable location or position along the shaft 110. As a non-limiting example, the second handle 112 can be formed (or attached) such that it is in line with the shaft and intersects a long-axis 114 that runs through the shaft 110. The shaft 106 can include multiple components (e.g., first shaft part 101 and second shaft part 103), with the second handle 112 separating those components.

Figure 1B:
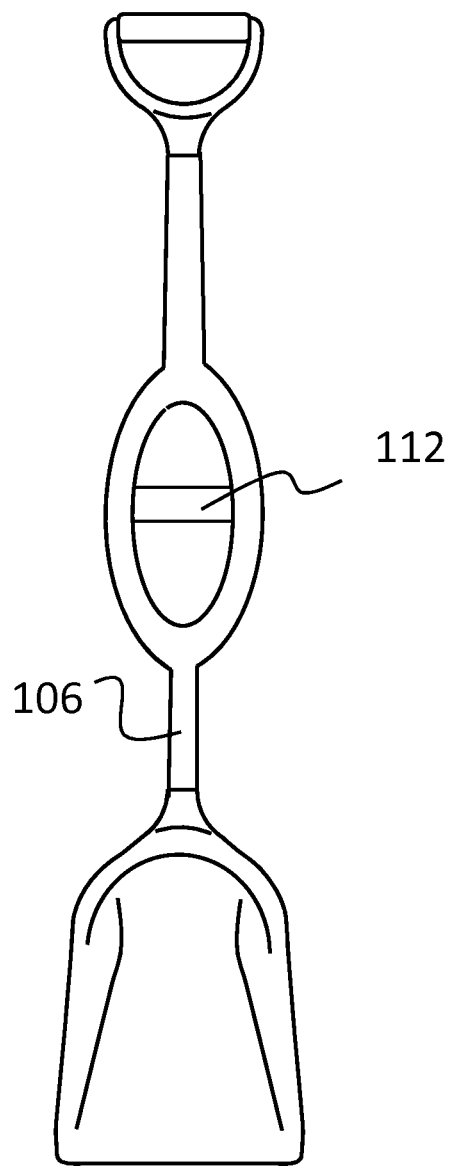
FIG. 1B is an illustration of a multi-handled tool according to the principles of the present invention, depicting the shaft as being formed as a single piece with the second handle attached thereto.

As an alternative non-limiting example and as depicted in FIG. 1B, the shaft 106 can be formed such that it is a single piece that bends around the second handle 112 to accommodate the second handle 112. The shaft 106 can be formed as single piece using any suitable technique, non-limiting examples of which include being molded plastic or fiberglass. In this aspect, the second handle 112 can be attached (e.g., bolted) within the shaft 106 or cast as a single piece with the shaft 106.

Alternatively, the second handle 112 can be formed such that it is offset from the long axis 114.

Referring again to FIG. 1A, it should be understood that the second handle 112 can be formed such that it is fixed at no particular angle and un-rotatable. For example, a casing 116 can be included in which the shaft 110 is attached at two ends of the casing 116. The second handle 112 can be permanently affixed within the case 116 such that it is set at a desired angle. Although not limited thereto, the second handle 112 is depicted as having a handle axis 118 that is orthogonal to the long axis 114.

In another aspect, the second handle 112 can be rotatable and operate as a rotating handle. In either aspect, the second handle 112 can be used in conjunction with the first handle 107. The first handle 107 includes a grip portion 120 located at user end of the tool. Moreover, the grip portion 120 includes a grip axis 122, with the grip portion 120 formed such that it is positioned at any suitable angle with respect to the long axis 114 and the handle axis 118. As a non-limiting example, the grip portion 120 is formed such that the grip axis 122 is positioned perpendicular to the long axis 114, yet parallel to the handle axis 118. Alternatively and as depicted in FIG. 4, the grip portion 120 can be formed such that the grip axis 122 it is perpendicular to both of the handle axis 118 and the long axis 114. In another aspect and as depicted in FIG. 6, the grip portion 120 is simply an extension of the shaft 106 such the grip axis 122 is in line with the long axis 114.

The grip portion 120 is formed of any suitable material to provide for stability and comfort of use. As a non-limiting example, the grip portion 120 is formed of a metal frame that is wrapped with a rubber sleeve.

The multi-handled tool 100 maximizes the usage of the tool implement 102 and the efficiency of the user. By implementing a second handle 112 on the shaft 110 of the tool 100, the user is able to use a greater amount of force with the tool implement 102.

As another improvement over the prior art, the tool 100 optionally includes a footstep 124 that allows for a greater down force (e.g., digging force). The footstep 124 is formed at the tool end 104 and can be integrally formed with the tool implement 102 or separately formed with the tool implement 102 attached thereto. Importantly, the footstep 124 is formed such that it intersects the long axis 114 of the shaft 110. When the user uses their foot to exert force, the multi-handled tool 100 becomes much more effective because the foot and leg strength is coupled with the body weight of the user to channel the tool implement 102 to a directed area. The user is able to use the entire force of their foot and leg as they push down on the center of the footstep 124 (which is directly in line with the long axis 114). In a standard shovel, the user may lose force by having to place their foot off-center while digging, often resulting digging an undesirably shaped hole. The present invention alleviates this issue. The user is able to exert force directly on-center of the foot step 124 to utilize an increased force in the directed area.

Figure 2:
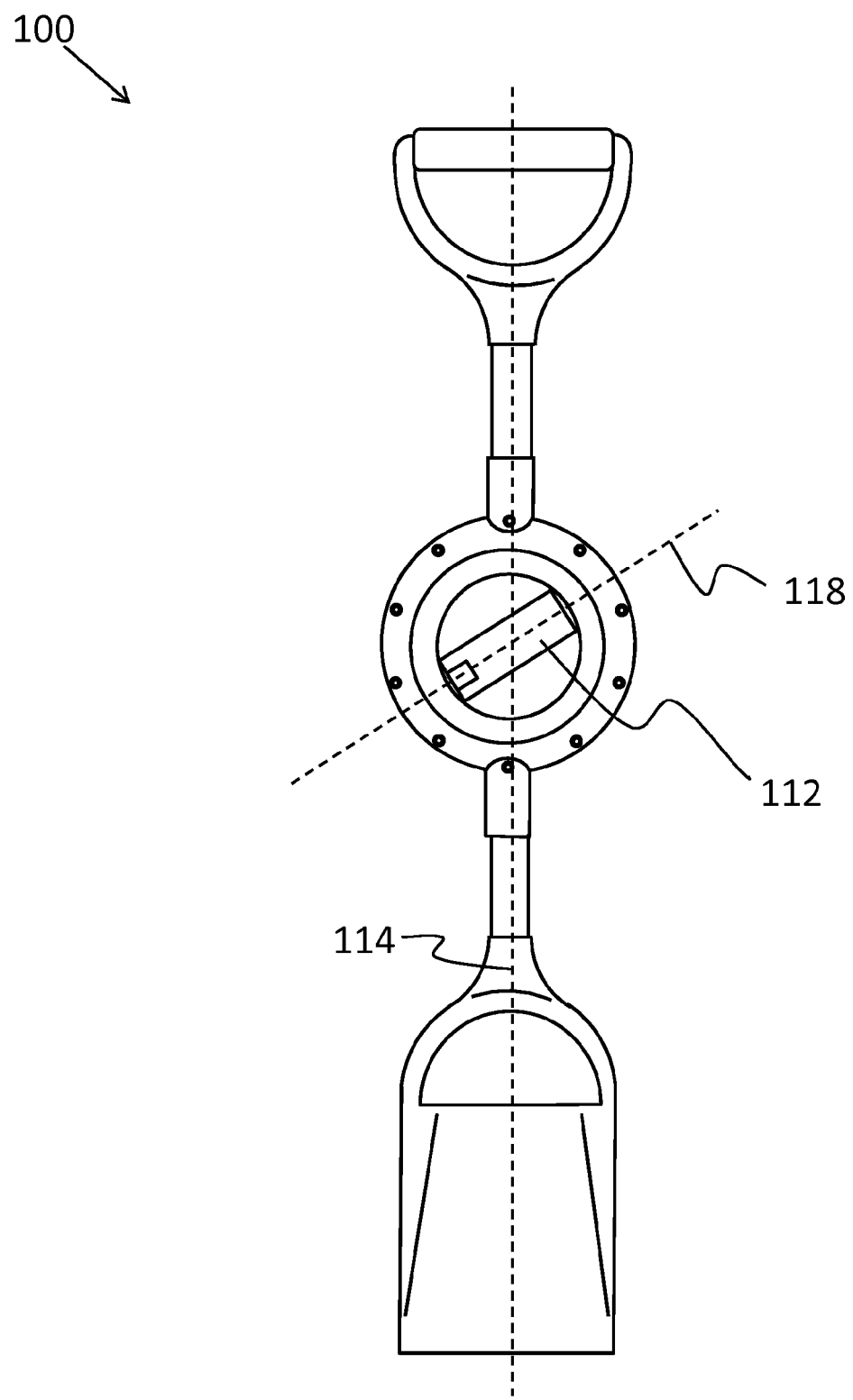
FIG. 2 is an illustration of a multi-handled tool according to the principles of the present invention, depicting the second handle as having been rotated.

As noted above, the second handle 112 can be formed such that it is rotatable. In other words and as shown in FIG. 2, the second handle 112 can be rotated by a user and locked into any desired position so that the user can adjust the angle of the second handle 112, thereby altering the angle of the handle axis 118 with respect to the long axis 114. This allows the user to adjust the second handle 112 to create maximum efficiency for a variety of jobs. As a non-limiting example, if the user uses the multi-handled tool 100 to move a pile of dirt into a hole to the left, the user can rotate the handle 107 from the horizontal position slightly down to allow for motion when moving dirt. Thus, the rotating second handle 112 allows for customizable positioning of the second handle 112 while using the tool 100.

Figure 8:
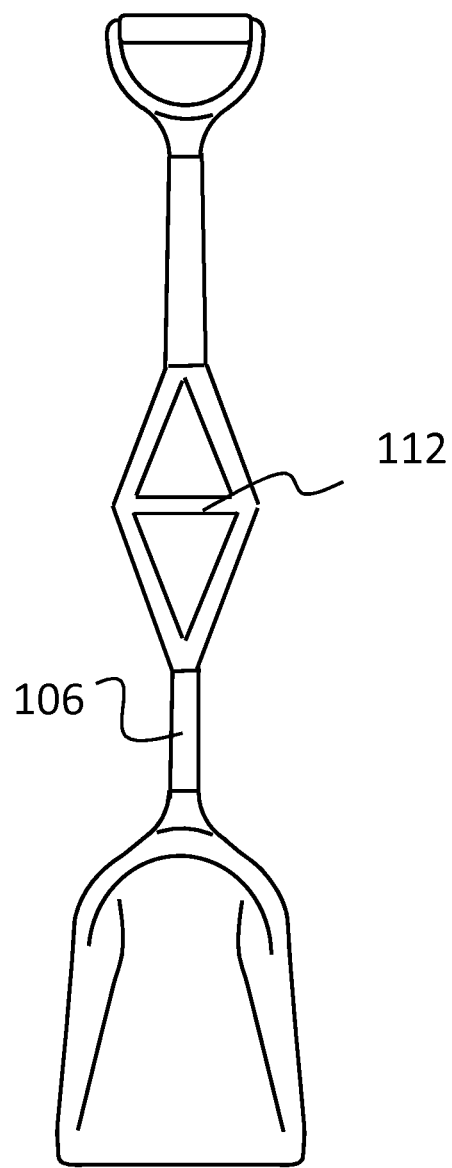
FIG. 8 is another illustration of a multi-handled tool according to the principles of the present invention, depicting the second handle being formed as a single piece attached to the shaft at both ends of the second handle.

In order to allow for rotation of the second handle 112, the tool 100 includes a rotating mechanism that allows for selective rotation and fixation of the second handle 112. It should be noted that although the second handle 112 appears to be affixed with a circular frame (i.e., the rotating mechanism), the invention is not intended to be limited thereto as it can be formed in any desired shape. For example, FIG. 1B and FIG. 8 illustrate a shaft 106 that includes a non-circular central portion that bends around to accommodate the central handle 112. As can be appreciated, there are numerous shapes and techniques by which the central handle 112 can be affixed with the shaft 106 as the present invention is not intended to be limited to any particular shape or technique.

Figure 3:
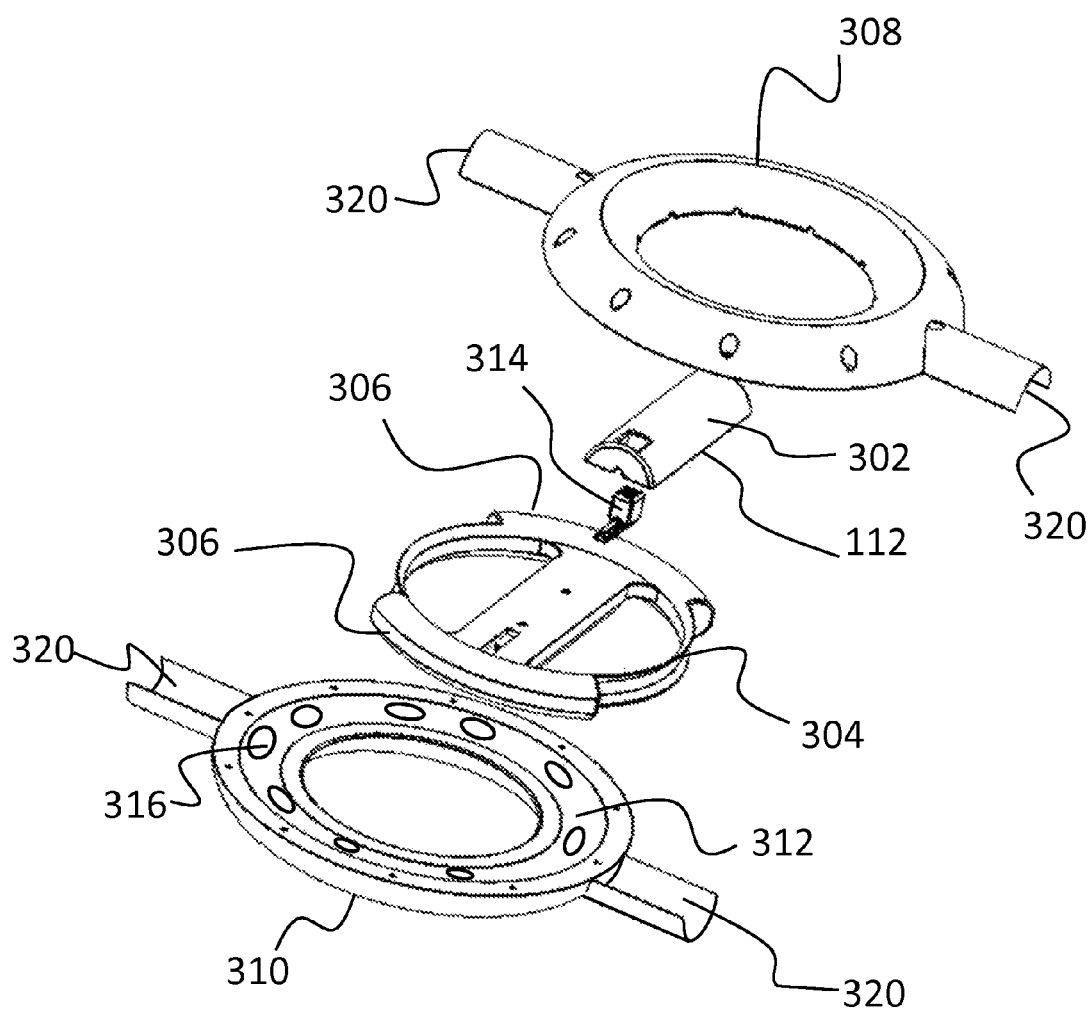
FIG. 3 is an exploded-view illustration of the second handle, illustrating an aspect in which the second handle is rotatable.

FIG. 3 is an exploded view illustration of the second handle 112 and the corresponding rotating mechanism. As can be understood by one skilled in the art, the rotating mechanism is any suitable mechanism or device that allows for selective rotation and fixation of the second handle 112. Thus, the aspect as illustrated in the figures and described herein is but one non-limiting example of a suitable rotating mechanism, as the invention is not intended to be limited thereto.

As shown, in this non-limiting aspect, the second handle 112 includes a second handle grip 302 that is affixed with a circular frame 304. The circular frame 304 includes sliding portions 306 that are formed to allow for rotation within a sleeve. For example, the rotating mechanism includes a first member 308 and a second member 310. Each of the first and second members 308 and 310 include a recess 312 that is formed to accommodate the sliding portions 306. In this aspect, the first and second members 308 and 310 act as clamshells that can be attached with one another (via screws or any other technique) with the circular frame 304 positioned there-between. Thus, when the circular frame 304 is positioned between the first and second members 308 and 310, the sliding portions 306 are allowed to rotate (e.g., 360 degrees) within the recess 312, thereby allowing a user to rotate the second handle 112.

As such, in operation, the rotating second handle 112 allows the user to rotate their hand to the most comfortable and efficient position. Thereafter, it may be desired to lock the second handle 112 in the desired position. In one aspect, the rotating mechanism includes a locking mechanism that allows the rotating handle 112 to be locked into place when the mechanism is activated. The locking mechanism may be unlocked and rotated to another angle to conform to the desire of the user.

The locking mechanism is any suitable mechanism or device that allows a user to selectively lock the rotating handle 112 into place. As a non-limiting example, the locking mechanism includes a locking lever 314 that is slidably attached with the circular frame 304 and that extends from the circular frame 304 to engage with at least one of the recesses 312. The locking lever 314 can be spring-loaded such that it is biased toward engaging with the recesses 312. Thus, when at rest, the locking lever 314 is forced toward the recesses 312 to prevent rotation of the circular frame 304. In operation, a user would retract the locking lever 314 from the recess 312 to allow for rotation of the circular frame 304.

As another non-limiting example, at least one of the recesses 312 can include a series of indentations 316 that are formed to accommodate a portion of the locking lever 314. Thus, in this non-limiting example, the locking lever 314 is biased to engage and lock into one of the indentations 316. A user could retract the locking lever 314 to allow for selective rotation of the circular frame 304 and, thereby, rotation of the second handle 112.

Once the rotating handle 112 is placed at the desired angle, the locking lever 314 locks the interior circular frame 304 into place. When the user desires to rotate the rotating handle 112 to a different angle, the locking lever 314 is unlocked (e.g., retracted from the indentation 316) and the circular frame 304 is free to rotate until the user decides to release the locking lever 314 and allow it to engage with another indentation 316. As noted above and repeated herein for clarity, the specific mechanism that allow for rotation of the second handle 112 is provided as a non-limiting example according to the principles of the present invention as the invention is not intended to be limited thereto.

It should be understood that in all aspects, the second handle 112 is attached with the shaft 106 using any suitable mechanism or technique. As a non-limiting example, the second handle 112 can simply be bolted to the shaft 106 directly (as shown in FIG. 1B) or via some sort of intermediate component. As a non-limiting example, the rotating mechanism shown in FIG. 3 operates to affix the second handle 112 to the shaft. In this non-limiting example and as can be appreciated and employed in other aspects, the first and second members 308 and 310 include shaft attachments 320 that operate to affix the second handle 112 to the shaft. In this aspect, the shaft parts (e.g., first shaft part 101 and second shaft part 103 as shown in FIG. 1A) can be inserted into and affixed with the shaft attachments 320 using any suitable attachment technique, non-limiting examples of which include being press fit and/or a bolt passing through the shaft attachments 320 and the shaft parts.

Referring again to FIG. 1A, the tool 100 includes a tool implement 102. The tool implement 102 is any desired tool that can be affixed with the tool end 104 of the shaft 110 (with any shovels, rakes, brooms, mops, grass edgers, floor scrapers, pitchforks and any other construction or home and garden tool with a long axis shaft as additional, non-sketched non-limiting examples). As a non-limiting example and as illustrated in FIG. 1A, the tool implement 102 can be a shovel, such as a flat-head shovel. Alternatively and as illustrated in FIGS. 4 through 7, the tool implement 102 can be a rake 400, a pointed spade shovel 500, a blade 600, and a snow shovel 700, respectively. Thus, the present invention is not intended to be limited to any particular tool implement as it can be used with any head/tool combination.

In summary, the present invention is a tool 100 that provides for a combination of a first handle, an ergonomically spaced second handle 112 that is completely adjustable and customizable, rotatable or stationary, optionally combined with the foot step 124 above the head of the tool end 104 to provide a home, garden, and construction tool that is much more efficient than the current comparable tools on the market today.

What is claimed is:

1. A hand-held tool, comprising:
    an elongated shaft defining a length between a first end and a second end, the length of the elongated shaft defining a first axis; and
    a handle functionally coupled to the elongated shaft, the handle defining a length between opposing distal ends, the length of the handle defining a second axis, the handle being configured to pivot with respect to the first axis between a parallel position wherein the first and second axes are parallel with one another and a transverse position wherein the first and second axes are transverse to one another;
    wherein the first axis intersects the handle at an intersection between opposing distal ends of the handle.

2. The hand-held tool of claim 1, wherein the handle is functionally coupled to the elongated shaft between the first and second ends of the shaft.

3. The hand-held tool of claim 1, wherein the first axis and the second axis intersect with one another.

4. The hand-held tool of claim 1, wherein the first axis and the second axis lie in a plane and the handle pivots in the plane.

5. The hand-held tool of claim 1, wherein the handle pivots with respect to the first axis about the intersection.

6. The hand-held tool of claim 1, further comprising a locking lever, the locking lever being operable to transition the handle between a free position and an engaged position, wherein in the free position the handle pivots with respect to the first axis and wherein in the engaged position the handle is locked with respect to the first axis.

7. A hand-held tool, comprising:
    an elongated shaft having a length defined between a first end and a second end, the length of the elongated shaft defining a first axis;
    a casing coupled to the elongated shaft between the first end and the second end; and
    a handle functionally coupled to the casing, the handle being configured to rotate with respect to the elongated shaft within the casing;
    wherein the casing defines a circular interior and the handle has a length defined between opposing distal ends, the opposing distal ends being functionally coupled to the circular interior; and
    wherein the first axis and the circular interior lie in a plane and the handle rotates in the plane.

8. The hand-held tool of claim 7, wherein the handle defines a length between opposing distal ends, the length of the handle defining a second axis, the handle being configured to rotate between a parallel position wherein the first and second axes are parallel with one another and a transverse position wherein the first and second axes are transverse to one another.

9. The hand-held tool of claim 7, wherein the handle rotates between a parallel position wherein the handle and the elongated shaft are parallel with one another and a transverse position wherein the handle and the elongated shaft are transverse to one another.

10. The hand-held tool of claim 7, further comprising a locking lever, the locking lever being operable to transition the handle between a free position and an engaged position, wherein in the free position the handle rotates with respect to the elongated shaft and wherein in the engaged position the handle is locked with respect to the elongated shaft.

11. The hand-held tool of claim 7, wherein the elongated shaft is comprised of a first shaft part and a second shaft part, the casing being coupled between the first shaft part and the second shaft part.

12. The hand-held tool of claim 7, further comprising a footstep and a tool implement, the tool implement being functionally coupled to the second end of the elongated shaft and the footstep being configured between the elongated shaft and the tool implement.

13. A hand-held tool, comprising:
    an elongated shaft having a first axis, the elongated shaft having a first shaft part and a second shaft part, each of the first shaft part and the second shaft part being aligned on the first axis;
    a casing coupled between the first shaft part and the second shaft part; and
    a handle functionally coupled to the casing, the handle being configured to rotate with respect to the elongated shaft within the casing.

14. The hand-held tool of claim 13, wherein the casing defines a circular interior, and wherein the first axis and the circular interior lie in a plane and the handle rotates in the plane.

15. The hand-held tool of claim 13, wherein the handle defines a length between opposing distal ends, the length of the handle defining a second axis, the handle being configured to rotate to adjust an angle between the first axis and the second axis.

16. The hand-held tool of claim 13, further comprising a locking lever, the locking lever being operable to transition the handle between a free position and an engaged position, wherein in the free position the handle rotates within the casing and wherein in the engaged position the handle is locked within the casing.

17. The hand-held tool of claim 13, further comprising a footstep and a tool implement, the tool implement being functionally coupled to the second shaft part and the footstep being configured between the second shaft part and the tool implement.

18. A hand-held tool, comprising:
    an elongated shaft defining a length between a first end and a second end, the length of the elongated shaft defining a first axis;
    a handle functionally coupled to the elongated shaft, the handle defining a length between opposing distal ends, the length of the handle defining a second axis, the handle being configured to pivot with respect to the first axis between a parallel position wherein the first and second axes are parallel with one another and a transverse position wherein the first and second axes are transverse to one another; and
    a locking lever, the locking lever being operable to transition the handle between a free position and an engaged position, wherein in the free position the handle pivots with respect to the first axis and wherein in the engaged position the handle is locked with respect to the first axis.

19. The hand-held tool of claim 18, wherein the handle is functionally coupled to the elongated shaft between the first and second ends of the shaft.

20. The hand-held tool of claim 18, wherein the first axis and the second axis intersect with one another.

21. The hand-held tool of claim 18, wherein the first axis and the second axis lie in a plane and the handle pivots in the plane.

22. The hand-held tool of claim 18, wherein the first axis intersects the handle at an intersection between opposing distal ends of the handle.

23. The hand-held tool of claim 22, wherein the handle pivots with respect to the first axis about the intersection.

24. A hand-held tool, comprising:
- an elongated shaft having a length defined between a first end and a second end, the length of the elongated shaft defining a first axis;
- a casing coupled to the elongated shaft between the first end and the second end; and
- a handle functionally coupled to the casing, the handle being configured to rotate with respect to the elongated shaft within the casing;
- wherein the elongated shaft is comprised of a first shaft part and a second shaft part, the casing being coupled between the first shaft part and the second shaft part.

25. The hand-held tool of claim 24, wherein the casing defines a circular interior and the handle has a length defined between opposing distal ends, the opposing distal ends being functionally coupled to the circular interior.

26. The hand-held tool of claim 25, wherein the first axis and the circular interior lie in a plane and the handle rotates in the plane.

27. The hand-held tool of claim 26, wherein the handle rotates between a parallel position wherein the handle and the elongated shaft are parallel with one another and a transverse position wherein the handle and the elongated shaft are transverse to one another.

28. The hand-held tool of claim 24, wherein the handle defines a length between opposing distal ends, the length of the handle defining a second axis, the handle being configured to rotate between a parallel position wherein the first and second axes are parallel with one another and a transverse position wherein the first and second axes are transverse to one another.

29. The hand-held tool of claim 24, further comprising a locking lever, the locking lever being operable to transition the handle between a free position and an engaged position, wherein in the free position the handle rotates with respect to the elongated shaft and wherein in the engaged position the handle is locked with respect to the elongated shaft.

30. The hand-held tool of claim 24, further comprising a footstep and a tool implement, the tool implement being functionally coupled to the second end of the elongated shaft and the footstep being configured between the elongated shaft and the tool implement.

* * * * *